May 26, 1953
C. W. BERTHIEZ
2,639,644
MACHINE TOOL SUCH AS BORING AND MILLING MACHINE
Filed May 27, 1947
3 Sheets-Sheet 1
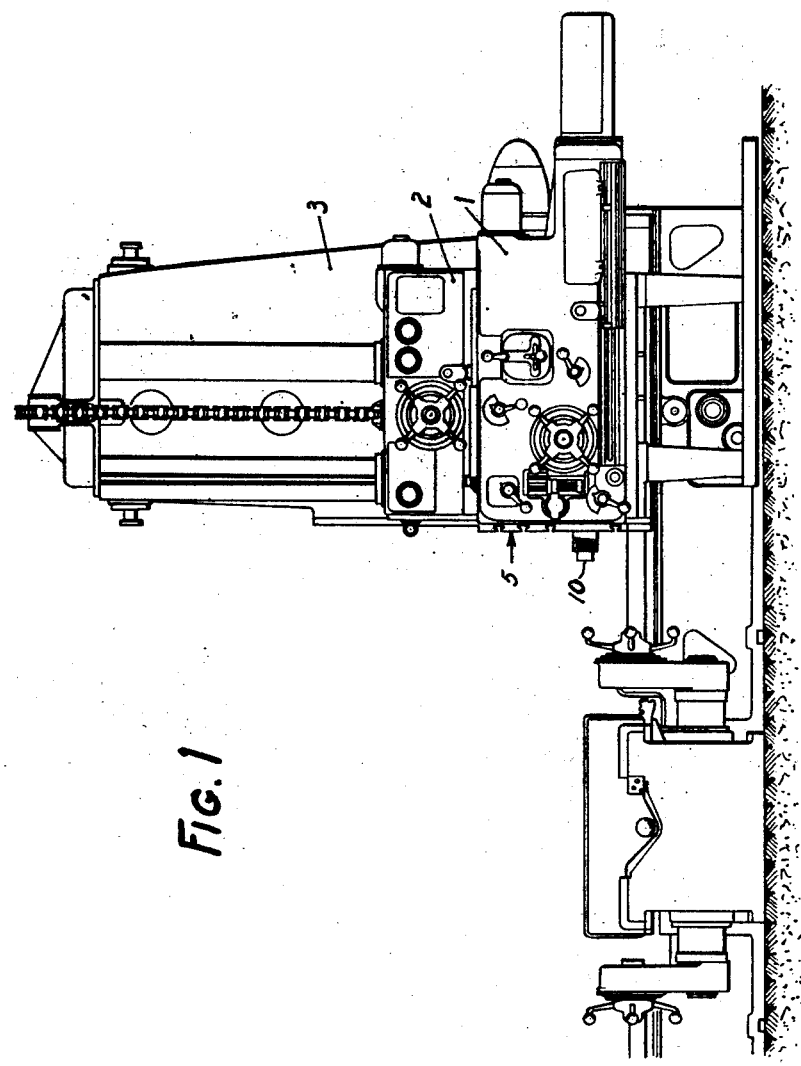
Charles William Berthiez
INVENTOR
By George Hlavrey
His Attorney May 26, 1953  C. W. BERTHIEZ  2,639,644
MACHINE TOOL SUCH AS BORING AND MILLING MACHINE
Filed May 27, 1947  3 Sheets-Sheet 2
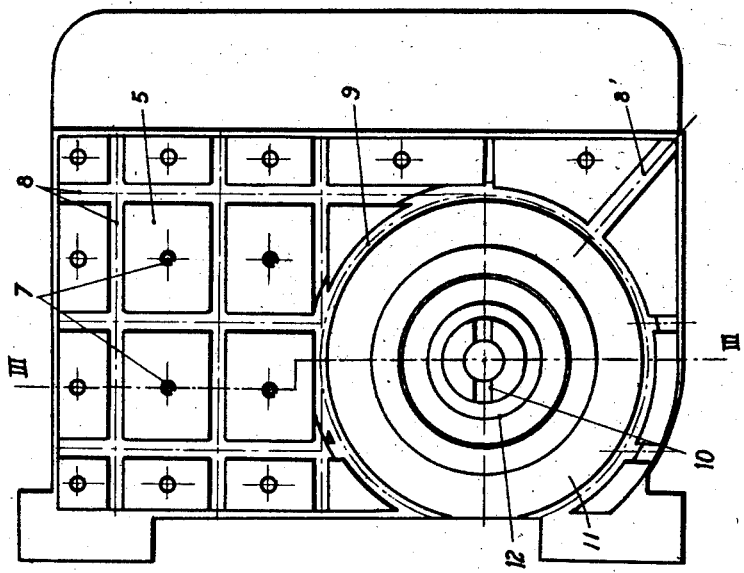
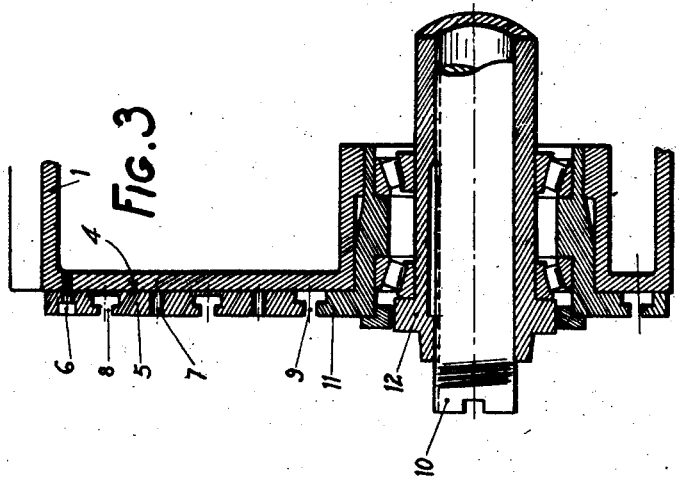
Charles William Berthiez
INVENTOR
By
George H. Corey
His Attorney Patented May 26, 1953

2,639,644

UNITED STATES PATENT OFFICE 2,639,644

MACHINE TOOL SUCH AS BORING AND MILLING MACHINE

Charles William Berthiez, Paris, France

Application May 27, 1947, Serial No. 750,772
In France June 4, 1946

4 Claims. (Cl. 90—20.5)

This invention relates to machine-tools and more especially to boring and milling machines called upon to perform different kinds of operations on differently shaped or located parts of workpieces. It is obvious that such constantly varying kind of work requires different types of tool-fittings to be mounted in position on the tool carrying face of the headstock of the machine. This, again, requires the drilling of holes in that face for the fixation of the particular fitting suitable for the operation to be started. If the headstock is formed with a machined and trued face to receive the many different fittings, this face becomes soon riddled with holes which in time render it necessary to replace the headstock altogether.

It is an object of this invention to provide simple and effective means whereby this necessity and the considerable expense connected with it can be avoided.

To this end, I provide a separate fixation plate formed with a machined and trued front face and I fix this plate for ready removal on the dressed transverse face of the headstock. It is on the dressed face of this plate that the fittings required for the different operations in view are mounted and the drilling of fixation holes is confined to the plate, while the face of the headstock remains permanently fit for use. Obviously, this seemingly simple expedient is adapted to save in time considerable expense and to cause only an insignificant period of time for the replacement of the plates which have become unfit for further use.

Preferably, the dressed faces of the replaceable fixation plates may be formed with grooves, perforations or apertures facilitating the fixing thereon of different kinds of fittings in different positions as may be required in each individual case.

Further features and advantages of my invention will appear in the reading of the following description and inspection of accompanying drawings illustrating diagrammatically and solely by way of example an embodiment of my invention. In the drawings:

Fig. 1 is an elevational view of the right hand side of a boring and milling machine to which the invention is applicable.

Fig. 2 is an elevational view of the front surface of the spindle supporting headstock with a fixation plate according to this invention fixed to it.

Fig. 3 is a cross section on the line III—III of Fig. 2.

Figure 4:
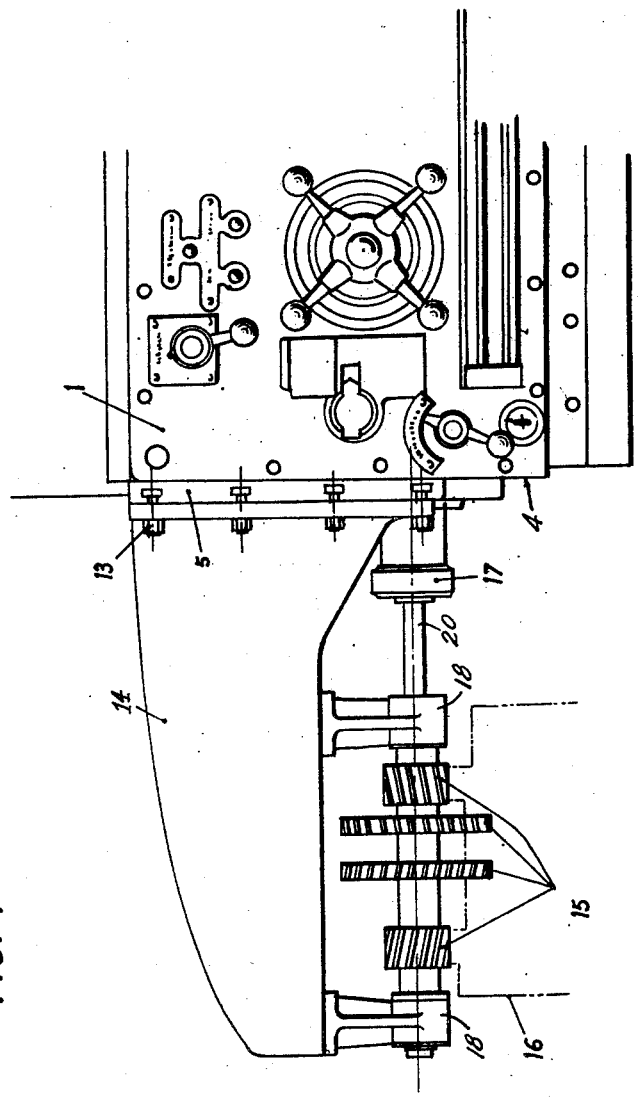
Fig. 4 is an elevational view of a part of the boring and milling machine illustrated in Fig. 1 together with a fitting supporting the front end of the tool spindle with milling cutters mounted thereon.

As apparent from the drawing, the boring and milling machine includes a spindle-carrying headstock 1 one lateral side of which that is apparent on Fig. 1 carries the necessary control and supervision parts that however do not form part of the invention.

The front surface 4 of the headstock is machined and trued to form a large bearing surface, on which to mount for ready removal the replaceable fixation plates 5, one of which is shown in position thereon in Figs. 2, 3 and 4, being held in place by means of screw bolts indicated in a conventional manner at 6 (Fig. 3).

This plate is formed with perforations 7 and with the undercut grooves 8 of inverted T or some other suitable section which are required for the secure fixing on the plate, of tool fittings of various kinds. While most of these grooves may extend vertically and/or horizontally, diagonal or other slanting grooves may also be provided as indicated by way of example at 8'. One or several curved grooves may also be provided in the plate surface, a circular groove 9 being shown by way of example as encircling the cylindrical bearing sleeve 11 surrounding the sheath 12 through which projects the spindle 10.

Fig. 4 illustrates, by way of example, the fixing in place by means of screw bolts 13, on the removable plate 5, of a heavy fitting 14 supporting in bearings 18 a shaft 20 with four milling cutters 15 mounted thereon which are shown in operation on a workpiece 16, said shaft being driven by a sleeve 17, secured to the sheath 12.

I wish it to be understood that I do not desire to be limited to the exact details shown and described, for obvious modifications will occur to a person skilled in the art.

What I claim is:

1. A machine tool comprising a headstock, means for supporting said headstock for movement thereof in a predetermined line of movement relative to said supporting means, a spindle carried by said headstock with its axis parallel to said line of movement of said headstock, and a part carried by and removably attached to said headstock in fixed bearing relation to an exterior surface thereof machined and trued in a predetermined relation to said line of movement of said headstock, said part being provided with a surface cooperating with said surface of said headstock to provide said bearing relation of said part to said headstock, said part being provided with a face exterior thereto with respect to said headstock and to said bearing surfaces, said face being of a substantial unobstructed area at a side of said spindle in a plane transversely of said line of movement of said headstock and trued in said plane with respect to said line of movement for attachment of tool fittings or the like so as to be rigidly and accurately held on said face in operative position at a side of said spindle.

2. A machine tool as defined in claim 1 in which said spindle is disposed in said headstock toward a side of said headstock generally parallel to the spindle axis and so that said face of substantial area is disposed toward the opposite side of said headstock.

3. A machine tool comprising a headstock, means for supporting said headstock for movement thereof in a predetermined line of movement relative to said supporting means, a plate carried by and removably attached to said headstock in fixed bearing relation to an exterior surface thereof machined and trued in a predetermined relation to said line of movement of said headstock, said plate being provided with a surface cooperating with said surface of said headstock to provide said bearing relation of said plate to said headstock, said plate being provided with a face exterior thereto with respect to said headstock and to said bearing surfaces, said exterior face of plate being of substantial unobstructed area in a plane in a predetermined relation to said line of movement of said headstock and trued in said plane with respect to said line of movement for attachment of tool fittings or the like to be accurately held on said face in operative position, said machine comprising also a spindle and a bearing member mounted in said headstock and supporting said spindle with its axis extending transversely of said exterior face of said plate and so that said plate extends about said spindle, said bearing member having a portion extending about said spindle and cooperating with said plate to provide means adapted to retain a fastening element for attachment of said tool fittings or the like to said headstock.

4. A machine tool as defined in claim 3 in which said bearing member is formed with a flange extending about the axis of said spindle, said flange providing a face machined and trued in said plane of said exterior face of said plate and formed with a rabbet extending circumferentially about said axis at the opposite side of said flange from said face thereof, said plate carried by said headstock in the portion thereof which extends about said axis being formed with a rabbet cooperating with said rabbet of said bearing member flange to provide a T-groove adapted to retain a fastening element for attachment of tool fittings or the like to said headstock.

CHARLES WILLIAM BERTHIEZ.

References Cited in the file of this patent

UNITED STATES PATENTS

| Number | Name | Date |
|---|---|---|
| 940,301 | Carlborg | Nov. 16, 1909 |
| 1,968,362 | West | July 31, 1934 |
| 2,227,410 | Johnson | Dec. 31, 1940 |
| 2,255,176 | Lucas et al. | Sept. 9, 1941 |

FOREIGN PATENTS

| Number | Country | Date |
|---|---|---|
| 7,236 | Great Britain | May 1, 1889 |
| 695,249 | Germany | Aug. 21, 1940 |